Patented Aug. 4, 1953

2,647,886

UNITED STATES PATENT OFFICE 2,647,886

WATER-SOLUBLE HETEROPOLYMERS FROM STYRENE, MALEIC ANHYDRIDE AND A CROSS-LINKING REACTANT

Raymond B. Seymour, Allentown, Pa., assignor to Monsanto Chemical Company, St. Louis, Mo., a corporation of Delaware No Drawing. Application May 15, 1951,
Serial No. 226,533

10 Claims. (Cl. 260—78.5)

The present invention relates to new water-soluble salts of heteropolymers of styrene and maleic anhydride.

An object of the present invention is the provision of new water-soluble salts of heteropolymers of styrene and maleic anhydride, the solutions of which possess the fluidity characteristics of non-Newtonian liquids.

Fluids possessing non-Newtonian or pseudo-plastic flow find many applications in industry. Such fluids are characterized by possessing an increasing fluidity as the force (shear) to which they are subjected is increased. Conversely a decreasing fluidity is manifested when such solutions are at rest, that is, when they are not subjected to any shearing force.

An example of a common material which desirably possesses non-Newtonian properties is paint. When brushing out a paint it is desirable that this be accomplished without too great an effort. It is also desirable that the brush marks left by the brush disappear rapidly, i. e., that the paint should "level" easily. The flow characteristics of paint which are effective in causing ease of brushing and leveling are commonly related to the viscosity of paint. The greater the fluidity the easier the paint may be brushed out and the more rapidly does the paint level itself.

Paint, however, is required to have a further important property. When brushed on a vertical surface it should not run. Conceivably this last requirement, which is met by a high viscosity fluid, is in conflict with the requirement that the viscosity be relatively low in order that brushing and leveling be facilitated. However, properly prepared paint has a high viscosity (low fluidity) at zero rates of flow (or shear). This discovery led to the designation of paint as a plastic material as distinguished from a viscous liquid.

Many other industrial materials or processes employing aqueous solutions require some degree of pseudo-plastic flow. Illustrative of such material are textile vat printing pastes, drilling muds, tooth paste, talc suspensions used in making dental impressions, dough, etc.

When salts of the styrene-maleic anhydride condensation product are dissolved in water, viscous solutions are formed. Such solutions may be employed for a variety of purposes. When such salts are prepared in the ordinary manner, water solutions thereof possess the fluidity characteristics of a Newtonian fluid.

This is evident from the following fluidity measurements made upon aqueous solutions of the sodium salt of a styrene-maleic anhydride heteropolymer. The heteropolymer was prepared by polymerizing an equimolecular mixture of styrene and maleic anhydride dissolved in monochlorobenzene for 4 hours at 90° C. The heteropolymer is recovered by filtration and dried to remove solvent by application of heat. The following measurements were made with a standard Stormer viscosimeter:

TABLE I

Load vs. fluidity of a 1% aqueous solution (pH=6.0) of the sodium salt of a styrene-maleic anhydride heteropolymer at 25° C.

| Load, Grams | Fluidity, Rev./Sec. Load |
|---|---|
| 19 | 0.0484 |
| 23 | 0.0479 |
| 30 | 0.0490 |
| 40 | 0.0487 |
| 55 | 0.0495 |
| 70 | 0.0500 |
| 85 | 0.0498 |
| 100 | 0.0495 |
| 110 | 0.0495 |

Solutions exhibiting a constant fluidity under varying loads or forces are customarily referred to as Newtonian or pseudo-plastic liquids.

I have now discovered that if styrene and maleic anhydride are polymerized in the presence of from 0.001 mole percent to 2.0 mole percent based upon the total moles of styrene and maleic anhydride present of a compound having at least two polymerizable groups, but not in excess of three polymerizable groups, said polymerizable groups being in non-conjugated relationship with each other and in the further presence of an inert organic solvent, the amount of solvent being at least equal to three times the total weight of said styrene and maleic anhydride, the alkali metal and ammonium salts thereof will be water-soluble and the solutions thereof will exhibit non-Newtonian fluidity.

The compound being at least two polymerizable groups is for convenience referred to herein as a "cross-linking" agent.

The mole percentage of the cross-linking agent is based upon the monomeric materials prior to polymerization, e. g., upon the total moles of styrene and maleic anhydride present in the mixture.

Suitable compounds which may be employed as cross-linking agents should have at least two polymerizable unsaturated double bonds, but not in excess of three such polymerizable groups in the molecule. I prefer to employ compounds in which at least one of the double bonds occupies the terminal position in the molecule, that is, the molecule contains at least one $CH_2=C$ group. It may, however, contain two and even three such groups. Suitable compounds are illustrated in the following list; however, the following list does not necessarily contain all the possible compounds usable in this invention.

Allyl acrylate
Methallyl acrylate
Allyl methacrylate
Crotyl acrylate
Crotyl methacrylate
Allyl ethacrylate
Allyl cinnamate
Methallyl methacrylate
Ethallyl acrylate
Ethallyl methacrylate
Allyl alpha-phenylacrylate
Allyl alpha-chloroacrylate
Diallyl phthalate
Dimethallyl phthalate
Diallyl maleate
Diallyl succinate
Diallyl oxalate
Divinyl benzene
Dimethallyl itaconate
Diethallyl itaconate
Diallyl malonate
Diallyl allylmalonate
Diallyl citrate
Triallyl citrate
Diallyl fumarate
Diallyl acetone
Divinyl ether
Diallyl ether
Dimethallyl ether
Glycol diacrylate (ethylene diacrylate)
Glycol dimethacrylate
Glyceryl diacrylate
Glyceryl dimethacrylate
Glycol diethacrylate
Trivinyl benzene The amount of the cross-linking agent employed is desirably limited to an amount of between 0.001 and 2.0 mole percent, since I have found that these amounts are necessary to produce a heteropolymer which will exhibit non-Newtonian fluidity characteristics in aqueous solution without the production of any insoluble polymeric material.

For best results the styrene and maleic anhydride are reacted in equal molar proportions, although minor variations in the actual proportions employed are permissible.

In preparing the present heteropolymers, the styrene and maleic anhydride and cross-linking compounds are dissolved in an amount of inert organic solvent equal to at least three times the total weight of the compounds to be polymerized. The solution resulting is stirred and heated sufficiently so that the polymerization reaction is caused to take place. At the completion of the polymerization reaction the heteropolymer is recovered from the organic solvent by any suitable means. The recovered heteropolymer is converted to the alkali metal or ammonium salt by solution in the appropriate aqueous hydroxide.

The addition of the cross-linking compound may be made to the mixture of styrene and maleic anhydride either prior to initiation of polymerization or during the course of polymerization. In the latter case, the addition may extend over part or all of the polymerization period.

Peroxy compounds may be present if it is desired to accelerate the rate of polymerization.

In order to obtain soluble products according to my invention the amount of organic solvent should be at least three times the total weight of styrene and maleic anhydride. Proportions of solvent in excess of this limit may be employed and in many cases as much solvent as 10 or 20 times the weight of styrene and maleic anhydride may be used.

The invention is further illustrated, but not limited, by the following examples:

EXAMPLE 1

A mixture consisting of 98 parts of maleic anhydride, 103.4 parts of styrene, 0.6 part of divinylbenzene (0.23 mole percent) and 4000 parts of acetone (all parts by weight) was maintained at a temperature of 50° C. for 10 days. The resulting reaction mixture was then poured into alcohol and there was thus obtained an 80% yield of a water-soluble interpolymer. The interpolymer was dissolved in water and converted to the sodium salt by the addition of sodium hydroxide.

A 0.75% solution of the sodium salt of the interpolymer in water was adjusted to a pH of 6.0. This was introduced into a Stormer viscometer, and the relationship between load and fluidity determined. The relationship is shown in Table II.

TABLE II

| Load, Grams | Secs. for 100 Revolutions | Revolutions Per Sec. | Fluidity, Rev./Sec. Load |
|---|---|---|---|
| 400 | 601.0 | 0.17 | 0.00043 |
| 600 | 250.0 | 0.40 | 0.00067 |
| 700 | 124.8 | 0.80 | 0.00114 |
| 800 | 92.3 | 1.09 | 0.00136 |
| 900 | 51.3 | 1.95 | 0.00216 |
| 1,000 | 42.1 | 2.38 | 0.00238 |
| 1,200 | 21.5 | 4.65 | 0.00388 |
| 1,250 | 16.8 | 4.95 | 0.00396 |

The above determinations were made at a temperature of 25° C. The time required for 100 revolutions under each load applied was recorded by means of a stop-watch. The apparent fluidity (fourth column above) was calculated as follows:

$$\text{Apparent fluidity} = \frac{\frac{100 \text{ (rev.)}}{\text{time (secs.)}}}{\text{load (grams)}} = \frac{100}{\text{time} \times \text{load}}$$

The above fluidity measurements indicate that an increase in the applied load (increasing shearing stress) results in a materially increased fluidity.

EXAMPLE 2

A mixture consisting of 98 parts of maleic anhydride, 102.5 parts of styrene and 1.5 parts by weight of divinyl benzene (0.55 mole percent), dissolved in 2000 parts of benzene, was subjected to polymerization at refluxing temperature. The resulting resin which precipitated, as it formed, was removed by filtration, washed and dried. The resin was then converted to the sodium salt as described in Example 1. A 1% aqueous solution of the sodium salt so obtained at a pH of 6.0 was tested for flow properties in the Stormer viscometer at a temperature of 25° C. The following results were obtained:

TABLE III

| Load, Grams | Secs. for 100 Revolutions | Revolutions Per Sec. | Fluidity, Rev./Sec. Load |
|---|---|---|---|
| 250 | 1,518.0 | 0.07 | 0.00028 |
| 400 | 700.4 | 0.14 | 0.00035 |
| 550 | 350.8 | 0.28 | 0.00051 |
| 750 | 138.2 | 0.75 | 0.00100 |
| 1,000 | 49.8 | 2.01 | 0.00201 |
| 1,250 | 21.3 | 4.69 | 0.00375 |
| 1,350 | 17.3 | 5.83 | 0.00432 |

EXAMPLE 3

A mixture consisting of 98 parts by weight of maleic anhydride, 103.9 parts of styrene and 0.1 part by weight of diallyl fumarate (0.005 mole percent) was subjected to polymerizing conditions as described in Example 1 and the product poured into alcohol. There was obtained in this manner a viscous, resinous material. The resin was converted to the sodium salt as described in Example 1 and 1, 2 and 4% by weight aqueous solutions of the sodium salt of the resin were then tested for fluidity in a Stormer viscosimeter at a temperature of 25° C. The results so obtained are given in Table IV.

TABLE IV

*Fluidity of several concentrations of solutions of the sodium salt of styrene-maleic acid heteropolymer cross-linked with 0.005 mole percent of diallyl fumarate*

| Conc., Percent | Load, Grams | Fluidity, Rev./Sec. Load |
|---|---|---|
| 1.0 | 20 | 0.0240 |
|  | 40 | 0.0265 |
|  | 70 | 0.0287 |
|  | 100 | 0.0304 |
|  | 130 | 0.0316 |
|  | 170 | 0.0325 |
| 2.0 | 20 | 0.0085 |
|  | 50 | 0.0090 |
|  | 70 | 0.0098 |
|  | 90 | 0.0099 |
|  | 110 | 0.0103 |
|  | 140 | 0.0109 |
|  | 180 | 0.0112 |
|  | 230 | 0.0119 |
|  | 280 | 0.0126 |
|  | 370 | 0.0138 |
| 4.0 | 40 | 0.0010 |
|  | 100 | 0.0011 |
|  | 200 | 0.0013 |
|  | 300 | 0.0014 |
|  | 450 | 0.0016 |
|  | 570 | 0.0017 |
|  | 720 | 0.0019 |
|  | 820 | 0.0020 |
|  | 1,000 | 0.0023 |
|  | 1,200 | 0.0026 |
|  | 1,500 | 0.0058 |

EXAMPLE 4

A heteropolymer of styrene and maleic anhydride was prepared as described in Example 2, but instead of forming the sodium salt, the heteropolymer was converted to the ammonium salt by the addition of ammonium hydroxide to a pH of 6.0. A 0.75% solution of the ammonium salt so prepared was placed in the Stormer viscometer and the load vs. fluidity relationship determined. The results obtained were as follows:

| Load, Grams | Fluidity, Rev./Sec. Load |
|---|---|
| 400 | 0.00003 |
| 700 | 0.00127 |
| 1,000 | 0.0031 |

Water-soluble salts of other alkali metals such as potassium, rubidium or cesium may be prepared, although because of the ease of obtaining the sodium and ammonium salts and their relative cheapness, these salts will be most commonly employed.

EXAMPLE 5

487 g. of maleic anhydride (4.96 moles), 517 g. (4.96 moles) of styrene were dissolved in 7,032 g. of benzene. The solution was heated to reflux and 60 g. of a divinyl benzene solution containing 34.9% by weight of divinyl benzene was added over a period of three hours. The product was recovered from the benzene and converted to the sodium salt by solution in aqueous sodium hydroxide. A 0.2% by weight solution at 25° C. had a viscosity of over 400 centipoises. The amount of cross-linking agent employed was 0.85 mole percent based on the styrene and maleic anhydride employed.

EXAMPLE 6

A series of tests were made in which the cross-linking effectiveness of divinylbenzene was compared with that of trivinylbenzene. For this purpose styrene and maleic anhydride were interpolymerized (1) in the absence of any cross-linking agent, (2) in the presence of p-divinylbenzene and (3) in the presence of trivinylbenzene. The three tests were carried out under the same experimental conditions which consisted in heating benzene solutions of the reactants at 75° C. for 20 hours. The benzene (solvent) present during polymerization was in excess of three times the weight of styrene and maleic anhydride. Benzoyl peroxide in the amount of 0.25% based on the benzene was present in each solution. Upon completion of polymerization the heteropolymers were converted to the sodium salt and a 0.2% aqueous solution prepared therefrom. The Stormer viscosity of each solution was measured. The following data were obtained:

| Cross-Linking Agent, Percent | Stormer, Viscosity cps. |
|---|---|
| None | 11.5 |
| 0.04 pure p-divinylbenzene | 26.7 |
| 0.04 pure trivinylbenzene | 35.7 |

From the above data it was estimated that the cross-linking effectiveness of 0.04% trivinylbenzene was approximately equal to 0.05% of p-divinylbenzene.

The amount of alkali metal employed to form the salt may be varied in accordance with the hydrogen ion concentration desired. The free acids of the heteropolymer have a hydrogen ion concentration in aqueous solution in the neighborhood of pH=3. By the addition of alkali metal hydroxides the pH can be raised and it will be found that for most purposes a pH of from 5 to 7 will be useful. However, for certain purposes it may be desirable to increase the amount of alkali added in order to attain a pH on the alkali side of neutrality.

This application is a continuation-in-part of my application Serial No. 626,433, filed November 2, 1945, and now abandoned.

I claim:

1. The water-soluble alkali metal and ammonium salts of the heteropolymer of styrene and maleic anhydride, said styrene and maleic anhydride being combined in substantially equimolecular proportions, said hetropolymer having been formed by interpolymerization of said styrene and maleic anhydride in the presence of from 0.001 to 2.0 mole percent, based upon the moles of styrene and maleic anhydride of a compound possessing only ethylenic polymerizable unsaturation, and having at least 2 polymerizable double bonds, but not in excess of 3 polymerizable double bonds in the molecule, said double bonds being in non-conjugated relationship to each other and in the further presence of an inert organic solvent, the amount of solvent being at least 3 times the total weight of said styrene and maleic anhydride.

2. The water-soluble alkali metal and ammonium salts of the heteropolymer of styrene and maleic anhydride combined in substantially equimolecular proportions, said heteropolymer having been formed by the interpolymerization of said styrene and maleic anhydride in the presence of from 0.001 to 2.0 mole percent, based upon the moles of styrene and maleic anhydride of diallyl fumarate and in the further presence of an inert organic solvent, the amount of solvent being at least 3 times the total weight of said styrene and maleic anhydride.

3. The water-soluble alkali metal and ammonium salts of the heteropolymer of styrene and maleic anhydride combined in substantially equimolecular proportions, said heteropolymer having been formed by the interpolymerization of said styrene and maleic anhydride in the presence of from 0.001 to 2.0 mole percent, based upon the moles of styrene and maleic anhydride of divinyl benzene and in the further presence of an inert organic solvent, the amount of solvent being at least 3 times the total weight of said styrene nad maleic anhydride.

4. The water-soluble alkali metal and ammonium salts of the heteropolymer of styrene and maleic anhydride combined in substantially equimolecular proportions, said heteropolymer having been formed by the interpolymerization of said styrene and maleic anhydride in the presence of from 0.001 to 2.0 mole percent, based upon the moles of styrene and maleic anhydride of diallyl succinate and in the further presence of an inert organic solvent, the amount of solvent being at least 3 times the total weight of said styrene and maleic anhydride.

5. A polymeric product comprising the interpolymerization product of (1) styrene, (2) maleic anhydride and (3) a compound possessing only ethylenic polymerizable unsaturation, and having at least 2 polymerizable double bonds but not in excess of 3 polymerizable double bonds in the molecule, said double bonds being in non-conjugated relationship with respect to each other, the proportions of (1) and (2) being substantially equimolecular and (3) being present to the extent of from 0.001 to 2.0 mole percent based on the moles of (1) and (2) present in the product, the said interpolymerization product having been formed in the presence of an inert organic solvent, the quantity of the said solvent being at least 3 times the total weight of said styrene and maleic anhydride and the said product being soluble in alkaline solutions.

6. A polymeric product comprising the interpolymerization product of (1) styrene, (2) maleic anhydride and (3) divinyl benzene, the proportions of (1) and (2) being substantially equimolecular and (3) being present to the extent of from 0.001 to 2.0 mole percent based on the moles of (1) and (2) present in the product, the said product having been formed in the presence of an inert organic solvent, the quantity of said solvent being at least 3 times the total weight of said styrene and maleic anhydride, and the said product being soluble in alkaline solutions.

7. The process for producing water-soluble alkali metal and ammonium salts of the heteropolymer of styrene and maleic anhydride which comprises interpolymerizing styrene and maleic anhydride in substantially equimolecular proportions in the presence of from 0.001 to 2.0 mole percent, based on the moles of styrene and maleic anhydride of a compound possessing only ethylenic polymerizable unsaturation, and having at least 2 polymerizable double bonds but not in excess of 3 polymerizable double bonds in the molecule, said double bonds being in non-conjugated relationship to each other and in the further presence of an inert organic solvent, the amount of solvent being at least 3 times the total weight of said styrene and maleic anhydride and then reacting the said interpolymerization product in aqueous solution with an alkaline material selected from the group consisting of alkali metal and ammonium hydroxide.

8. The process for producing water-soluble alkali metal and ammonium salts of the heteropolymer of styrene and maleic anhydride which comprises interpolymerizing styrene and maleic anhydride in substantially equimolecular proportions in the presence of from 0.001 to 2.0 mole percent, based on the moles of styrene and maleic anhydride of diallyl fumarate and in the further presence of an inert organic solvent, the amount of solvent being at least 3 times the total weight of said styrene and maleic anhydride and then reacting the said interpolymerization product in aqueous solution with an alkaline material selected from the group consisting of alkali metal and ammonium hydroxide.

9. The process for producing water-soluble alkali metal and ammonium salts of the heteropolymer of styrene and maleic anhydride which comprises interpolymerizing styrene and maleic anhydride in substantially equimolecular proportions in the presence of from 0.001 to 2.0 mole percent, based on the moles of styrene and maleic anhydride of divinyl benzene and in the further presence of an inert organic solvent, the amount of solvent being at least 3 times the total weight of said styrene and maleic anhydride and then reacting the said interpolymerization product in aqueous solution with an alkaline material selected from the group consisting of alkali metal and ammonium hydroxides.

10. The process for producing water-soluble alkali metal and ammonium salts of the heteropolymer of styrene and maleic anhydride which comprises interpolymerizing styrene and maleic anhydride in substantially equimolecular proportion in the presence of from 0.001 to 2. mole percent, based on the moles of styrene and maleic anhydride of diallyl succinate and in the further presence of an inert organic solvent, the amount of solvent being at least 3 times the total weight of said styrene and maleic anhydride and then reacting the said product in aqueous solution with an alkali material selected from the group consisting of alkali metal and ammonium hydroxides.

RAYMOND B. SEYMOUR.

References Cited in the file of this patent

UNITED STATES PATENTS

| Number | Name | Date |
|---|---|---|
| 2,340,110 | D'Alelio | Jan. 25, 1944 |
| 2,409,861 | Hunter | Oct. 27, 1946 |
| 2,471,818 | Hunter | May 31, 1949 |